(12) United States Patent
Tsai

(10) Patent No.: US 7,563,088 B2
(45) Date of Patent: Jul. 21, 2009

(54) MOLDING ASSEMBLY

(75) Inventor: Ming-Chiang Tsai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 253 days.

(21) Appl. No.: 11/557,900

(22) Filed: Nov. 8, 2006

(65) Prior Publication Data

US 2007/0243277 A1    Oct. 18, 2007

(30) Foreign Application Priority Data

Apr. 14, 2006    (CN) .................. 2006 1 0060318

(51) Int. Cl.
  *B29C 33/30*    (2006.01)
  *B29D 11/00*    (2006.01)

(52) U.S. Cl. .............. 425/193; 425/195; 425/808

(58) Field of Classification Search ............. 425/175, 425/177, 190, 191, 192 R, 193, 352, 395, 425/406, 408, 436 R, 436 RM, 466–468, 425/517, 808, 394, 441, 443, 577; 264/1.32, 264/1.1, 2.5; 65/305; 249/63, 64, 175, 177
See application file for complete search history.

(56) References Cited

U.S. PATENT DOCUMENTS

| | | | | |
|---|---|---|---|---|
| 3,079,737 | A * | 3/1963 | Kratt et al. .................. | 451/384 |
| 3,273,204 | A * | 9/1966 | Craddock .................... | 425/394 |
| 4,208,365 | A * | 6/1980 | LeFevre ..................... | 264/2.2 |
| 4,708,314 | A * | 11/1987 | Kuhling ...................... | 249/103 |
| 4,861,254 | A * | 8/1989 | Takeuchi et al. ............. | 425/190 |
| 5,512,221 | A * | 4/1996 | Maus et al. .................. | 264/2.5 |
| 5,792,392 | A * | 8/1998 | Maus et al. .................. | 264/2.5 |
| 6,308,929 | B1 * | 10/2001 | Wieder ........................ | 249/103 |
| 6,328,552 | B1 * | 12/2001 | Hendrickson et al. ........ | 425/188 |
| 6,929,761 | B2 * | 8/2005 | Gelardi et al. ............. | 264/1.31 |
| 7,121,823 | B2 | 10/2006 | Chen et al. | |
| 7,255,550 | B2 * | 8/2007 | Chiang ........................ | 425/193 |
| 7,273,204 | B2 | 9/2007 | Chen | |
| 7,431,580 | B2 | 10/2008 | Chiang | |
| 2006/0286196 | A1 * | 12/2006 | Chien ......................... | 425/468 |
| 2007/0048454 | A1 | 3/2007 | Chen et al. | |
| 2007/0104827 | A1 * | 5/2007 | Tsai ............................ | 425/577 |
| 2007/0114699 | A1 | 5/2007 | Chang | |
| 2007/0122514 | A1 * | 5/2007 | Tsai ............................ | 425/190 |
| 2007/0190204 | A1 * | 8/2007 | Chiang ........................ | 425/577 |

* cited by examiner

*Primary Examiner*—Philip C Tucker
*Assistant Examiner*—Dimple N Bodawala
(74) *Attorney, Agent, or Firm*—Frank R. Niranjan

(57) ABSTRACT

An exemplary molding assembly includes: a first mold housing defining a first engaging hole; a second mold housing configured for attachment to the first mold housing; a containing block received in the first mold housing and defining a second engaging hole; a first core member received in the first containing block and having a molding surface thereon; a second core member received in the second mold housing for matching with the first core member; a first elongated adjusting member having a first portion locked by rotational engagement in the first engaging hole and a second portion in threaded engagement with the containing block; a second elongated adjusting member having a first portion locked by rotational engagement in the second engaging hole and a second portion in threaded engagement with the first core member. Lengthwise directions of the first and the second elongated adjusting members are oriented perpendicular to each other.

17 Claims, 7 Drawing Sheets

“MOLDING ASSEMBLY

CROSS-REFERENCE TO RELATED APPLICATIONS

This application is related to commonly-assigned co-pending applications entitled, "MOLD FOR FORMING OPTICAL LENS AND METHOD FOR MANUFACTURING SUCH MOLD", filed on Mar. 8, 2006 (U.S. application Ser. No. 11/308,128), "METHOD FOR MANUFACTURING A CORE MEMBER", filed on Jun. 28, 2006 (U.S. application Ser. No. 11/478,414), and "MOLD AND MOLD RELEASING METHOD OF THE SAME", filed on Jul. 17, 2006 (U.S. application Ser. No. 11/458,079), and "MOLD FOR FORMING WORKPIECE", filed on Oct. 13, 2006 (U.S. application Ser. No. 11/309,859). Disclosures of the above identified applications are incorporated herein by reference.

TECHNICAL FIELD

The present invention relates generally to molding assemblies, and more particularly, to an adjustable molding assembly.

BACKGROUND

With the development of industry, molding processes are widely used for manufacturing workpieces, for example, optical articles such as lenses and light guide plates. Such workpieces are needed to satisfy often-conflicting requirements or compactness, low cost, and excellent quality.

In a molding process of the related art, the molding process utilizes a molding assembly for forming a workpiece. The molding assembly typically includes a first mold part and a second mold part, the first mold part and the second mold part each may have a mold housing and a core member mounted in the mold housing using location blocks or pins. Both of the core members have a molding surface conforming to a surface of the workpiece. When the first mold part and the second mold part are brought together, a mold chamber according to a size of the workpiece is defined between the two molding surfaces of the core members.

However, a loss of concentricity may occur between the two molding surfaces of the core members after bringing together the first mold part and the second mold part, this may be caused by abrasion of the location blocks or pins and requires disassembly and modification of the molding assembly to repair it, so high costs can not be avoided.

What is needed, therefore, is an adjustable molding assembly.

SUMMARY

In a preferred embodiment, an exemplary molding assembly includes a first mold housing, a second mold housing, a containing block, a first core member, a second core member, a first elongated adjusting member and a second elongated adjusting member. The first mold housing defines a first engaging hole therein, the second mold housing is configured for attachment to the first mold housing. The containing block is received in the first mold housing and defines a second engaging hole therein. The first core member is received in the first containing block and has a molding surface thereon, the second core member is received in the second mold housing for matching with the first core member. The first elongated adjusting member has a first portion locked by rotational engagement in the first engaging hole of the first mold housing and a second portion in threaded engagement with the containing block, the second elongated adjusting member has a first portion locked by rotational engagement in the second engaging hole of the containing block and a second portion in threaded engagement with the first core member, a lengthwise direction of the first elongated adjusting member is oriented perpendicular to a lengthwise direction of the second elongated adjusting member.

Other objects, advantages and novel features of the invention will become more apparent from the following detailed description when taken in conjunction with the accompanying drawings.

BRIEF DESCRIPTION OF THE DRAWINGS

Many aspects of the molding assembly can be better understood with reference to the following drawings. The components in the drawing are not necessarily drawn to scale, the emphasis instead being placed upon clearly illustrating the principles of the present molding assembly. Moreover, in the drawings, like reference numerals designate corresponding parts throughout the several views.

DETAILED DESCRIPTION OF THE PREFERRED EMBODIMENTS

Figure 1:
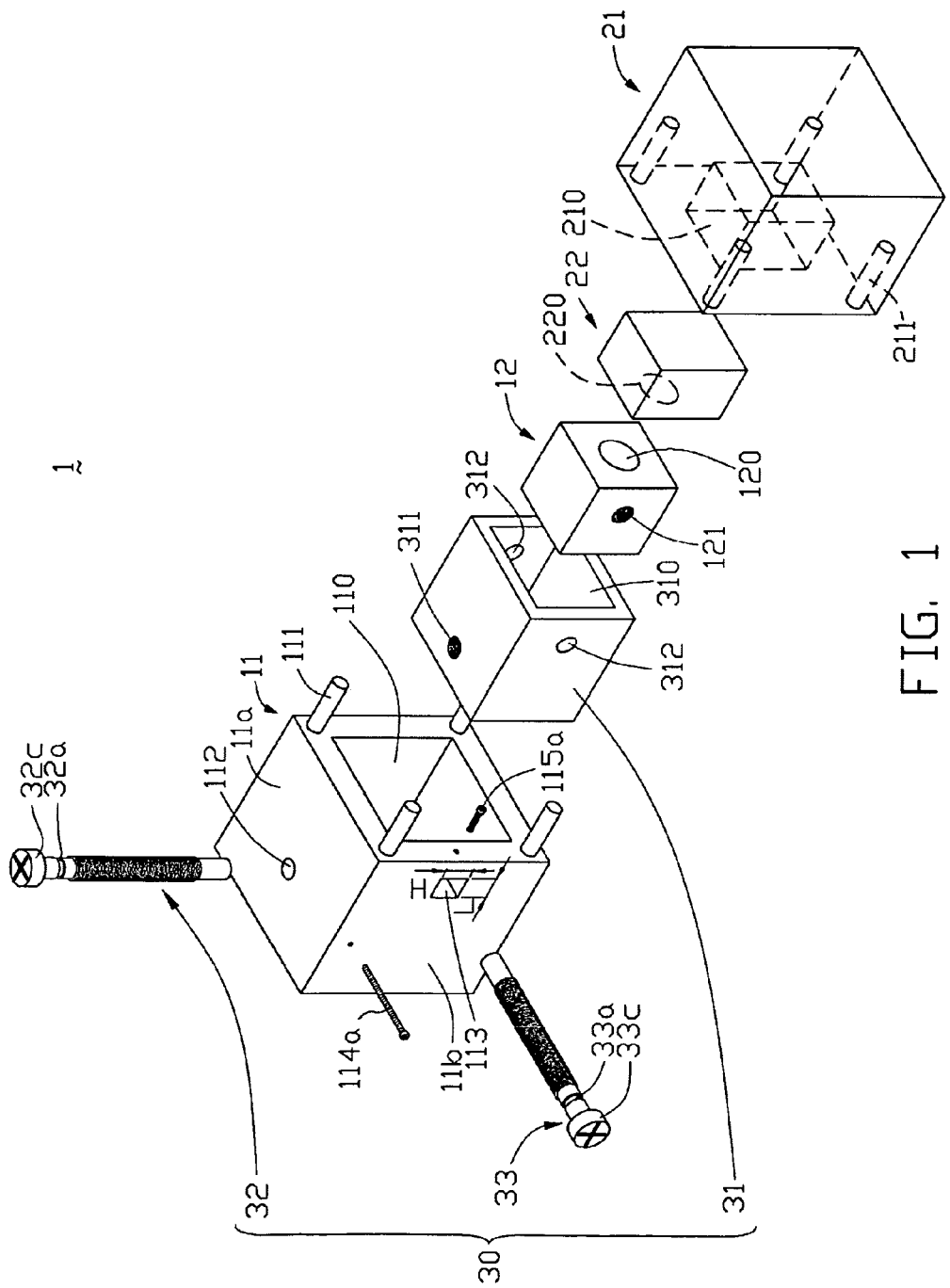
FIG. 1 is a disassembled perspective view of a molding assembly according to a first preferred embodiment.
Figure 2:
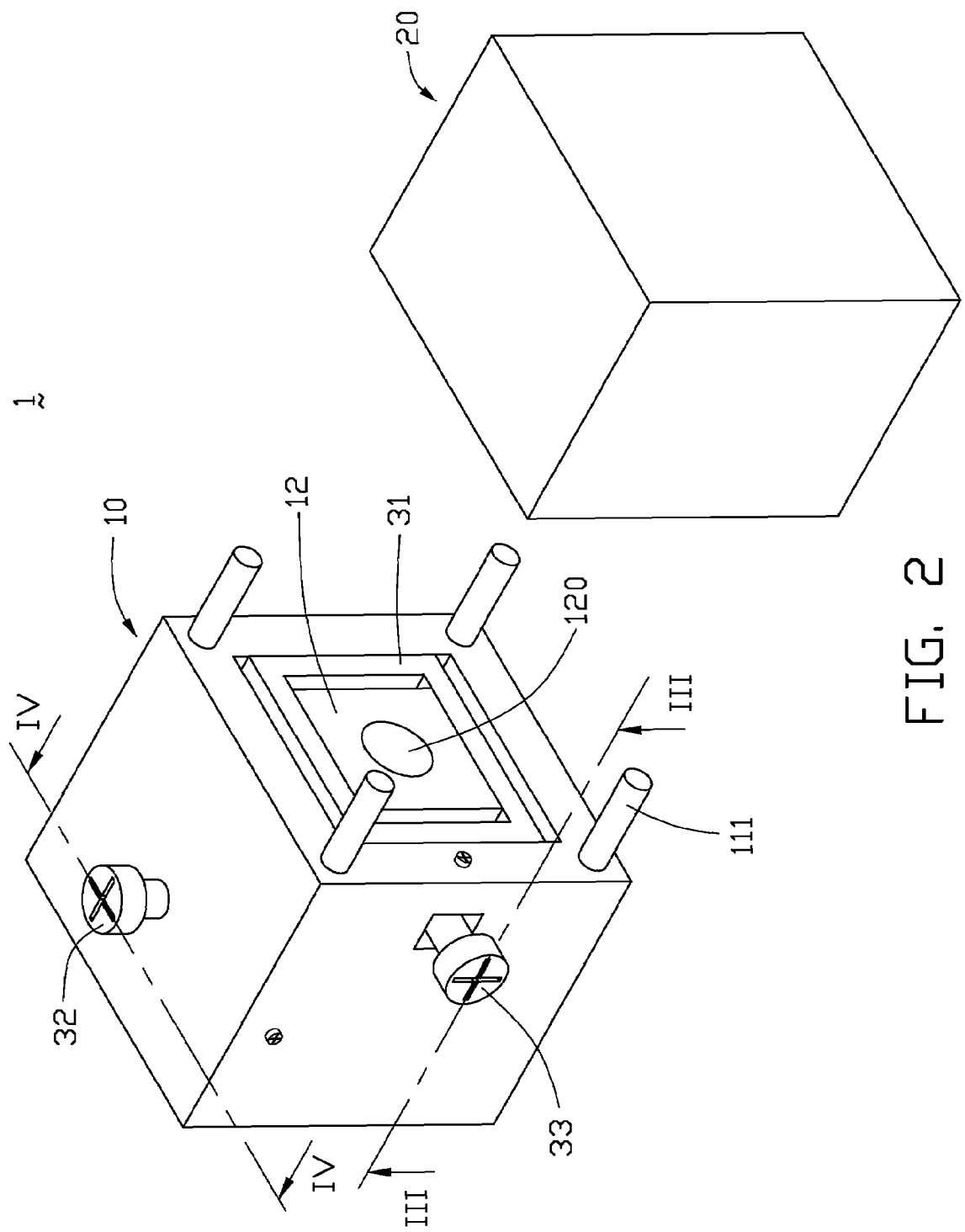
FIG. 2 is an assembled perspective view of the molding assembly shown in FIG. 1.
Figure 3:
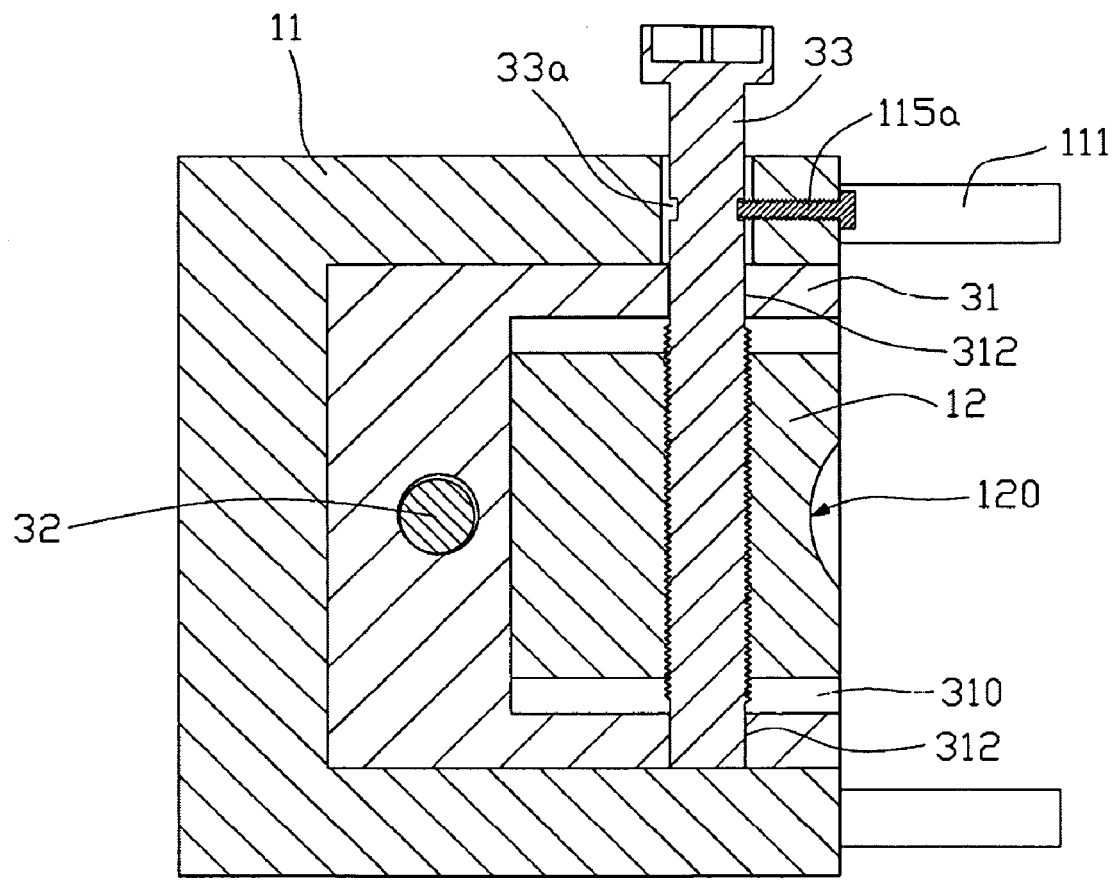
FIG. 3 is an enlarged, cross-sectional view taken along line III-III of the first mold part shown in FIG. 2.
Figure 4:
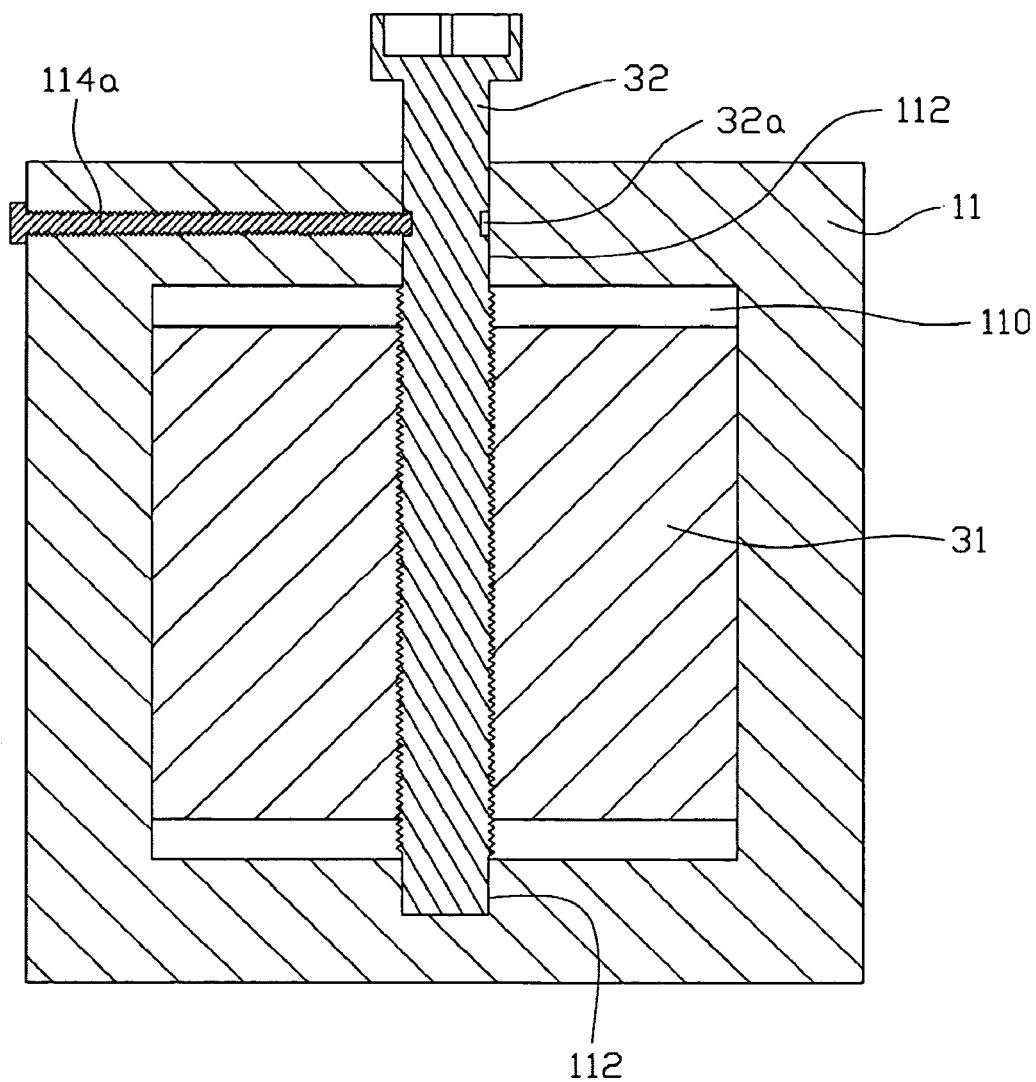
FIG. 4 is an enlarged, cross-sectional view taken along line IV-IV of the first mold part shown in FIG. 2.

Embodiments of the present molding assembly will now be described in detail below and with reference to the drawings.

Referring to FIGS. 1 to 4, an exemplary molding assembly 1 according to a first preferred embodiment includes a first mold part 10, and a second mold part 20 configured (i.e., structured and arranged) for engaging with the first mold part 10.

The first mold part 10 includes a mold housing 11, a core member 12, and an adjustment assembly 30. The adjustment assembly 30 includes a containing block 31, a first elongated adjusting member 32 and a second elongated adjusting member 33. The second mold part 20 includes a mold housing 21 and a core member 22.

The mold housing 11 is a mold plate having a substantially rectangular shape and defining a housing space 110 in the center thereof. The housing space 110 is rectangular shaped, and is configured for receiving the containing block 31. Two first engaging holes 112 are defined in communication with the housing space 110. One of the and first engaging holes 112 is defined through a top wall 11a of the mold housing 11, and the other first engaging hole 112 is defined in a bottom wall of the mold housing 11. The first engaging holes 112 are configured for holding the first elongated adjusting member 32, with the first elongated adjusting member 32 being rotatable therein. An opening 113 is defined through a side wall 11b perpendicularly connecting to the top wall 11a of the mold housing, 11. An axis of each of the first engaging holes 112 is defined perpendicular to an axis of the opening 113. A height H of the opening 113, which is defined parallel to a lengthwise direction of the first elongated adjusting member 32, should preferably be larger than a width L of the opening 113. The containing block 31 is shaped according to the housing space 110 of the mold housing 11, and has a containing space 310 in the center thereof. The containing space 310 is configured for receiving the core member 12 with a mold surface 120 thereon. A threaded hole 311 is defined through the containing block 31 and in alignment with the engaging holes 112. Two second engaging holes 312 are respectively defined through two opposite side walls of the containing block 31 and in alignment with the opening 113. The second engaging holes 312 are configured for holding the second elongated adjusting member 33, with the second elongated adjusting member 33 being rotatable therein. A threaded hole 121 is defined through the core member 12 and in alignment with the second engaging holes 312.

The first elongated adjusting member 32 and the second elongated adjusting member 33 each may be an adjusting screw with an elongated shaft. The first elongated adjusting member 32 and the second elongated adjusting member 33 respectively have heads 32c, 33c at outmost ends thereof, a first portion, a second portion extending from the first portion, and the third portion extending from the second portion. The head 32c is disposed outside of the first engaging hole 112 at the top wall 11a. The head 33c is disposed outside of the opening 113 at the side wall 11b. The first portions respectively define recesses 32a, 33a shaped around the shafts thereof, and both of the second portions are threaded. The first portions and third portions are held but rotatable in the first and second engaging holes 112, 312, respectively. A latching member 114a which can be a screw threadedly engaged with the mold housing 11 protrudes from an inner surface of the top one of the first engaging holes 112 and latchingly engages in the recess 32a of the first elongated adjusting member 32. A latching member 115a which can be a screw threadedly engaged with the mold housing 11 protrudes from an inner surface of the opening 113 and latchingly engages in the recess 33a of the second elongated adjusting member 33. The latching member 114a and the latching member 115a are respectively configured for preventing the first elongated adjusting member 32 and the second elongated adjusting member 33 from moving along a longitudinal direction of the shaft thereof. The second portion of the first elongated adjusting member 32 is threadedly engaged in the threaded hole 311 of the containing block 31. The second portion of the second elongated adjusting member 33 is threadedly engaged in the threaded hole 121 of the core member 12.

The mold housing 21 is also a mold plate having a housing space 210 in the center thereof. The housing space 210 is configured for receiving the core member 22 with a molding surface 220 thereon.

A number of leader pins 111 protrude from the mold housing 11, and a number of leader bushings 211 are mounted facing towards the mold housing 11 in the mold housing 21. The leader pins 111 and the leader bushings 211 are configured for cooperatively orient the first mold part 10 to the second mold part 20 in directions when the first mold part 10 and the second mold part 20 are brought together. Other location members or guide members can also be configured for assisting the core member 12 to be coupled to the core member 22. Additionally, an injection system including sprues, runners, cold-slug wells, puller pins, and an ejection system including ejecting pins can be mounted in the first mold part 10 or the second mold part 20.

When the first mold part 10 and the second mold part 20 are brought together, a mold chamber (not shown) for forming a workpiece is defined between the two molding surfaces 120, 220 of the cores member 12, 22, then the workpiece can be formed therein. When the workpiece is finally formed, the workpiece is ejected from the mold chamber, then a concentricity of two opposite surfaces of the workpiece can be tested. If a loss of concentricity of the two opposite surfaces of the workpiece is tested, a loss of concentricity is correspondingly likely to occur between the molding surface 120 of the core member 12 and the molding surface 220 of the core member 22. The molding surface 120 of the core members 12 can be adjusted in time to match with the molding surfaces 220 of the core members 22 as follows: rotating the first elongated adjusting member 32, by which the containing block 31 can be driven to move along a lengthwise direction of the first elongated adjusting member 32, the core member 12 received in the containing block can thus be moved along therewith, and together, the second elongated adjusting member 33 can be moved along therewith in the opening 113, this resulted in the core member 12 being moved upwards or downwards relative to the core member 22; rotating the second elongated adjusting member 33, by which the core member 12 can be driven to move along a lengthwise direction of the second elongated adjusting member 33, i.e., the core member 12 can be moved left or right relative to the core member 22.

As stated above, the first mold part 10 is coupled to the second mold part 20 by means of several members including the leader pins 111 and the leader bushings 211, thus the loss of concentricity between the two molding surfaces 120, 220 of the core members 12, 22 is greatly reduced. Therefore a size of a free space provided for movement of the core member 12 in the containing space 310, and a size of a free space provided for movement of the containing block 31 in the housing space 110, can both be just large enough for the movement. Accordingly burr problems in runners (not shown) to the mold chamber can be avoided.

Figure 5:
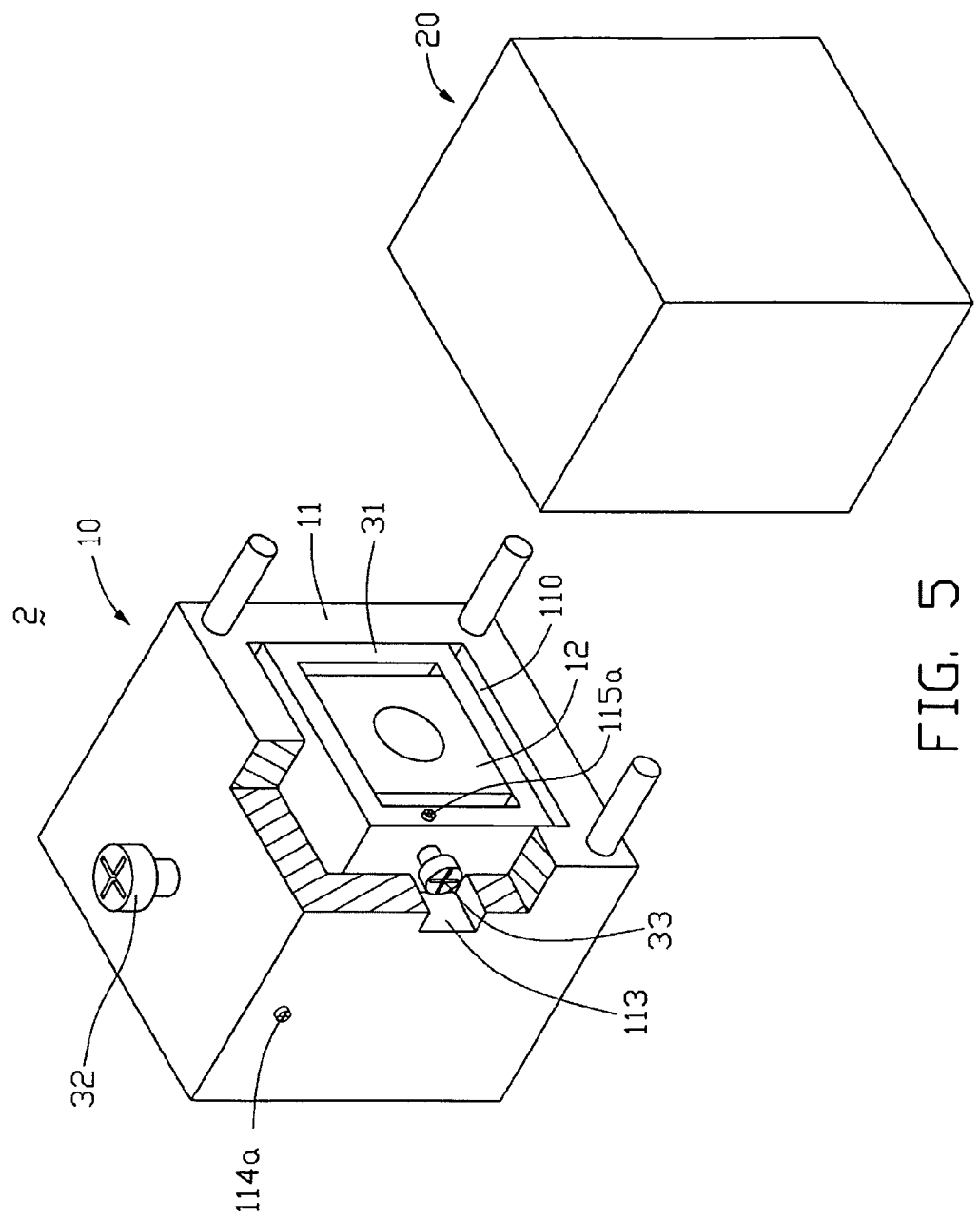
FIG. 5 is a partially cut-away view of a molding assembly according to a second preferred embodiment.

FIG. 5 shows an exemplary molding assembly 2 according to a second preferred embodiment. The molding assembly 2 is essentially similar to the molding assembly 1 illustrated in the first preferred embodiment. However, the second elongated adjusting member 33 is located substantially within the housing space 110 of the mold housing 11. The latching member 115a is threadedly engaged with the containing block 31, and functions to prevent the second elongated adjusting member 33 from moving along a lengthwise direction. A tool can access the opening 113 to rotate the second elongated adjusting member 33.

Figure 6:
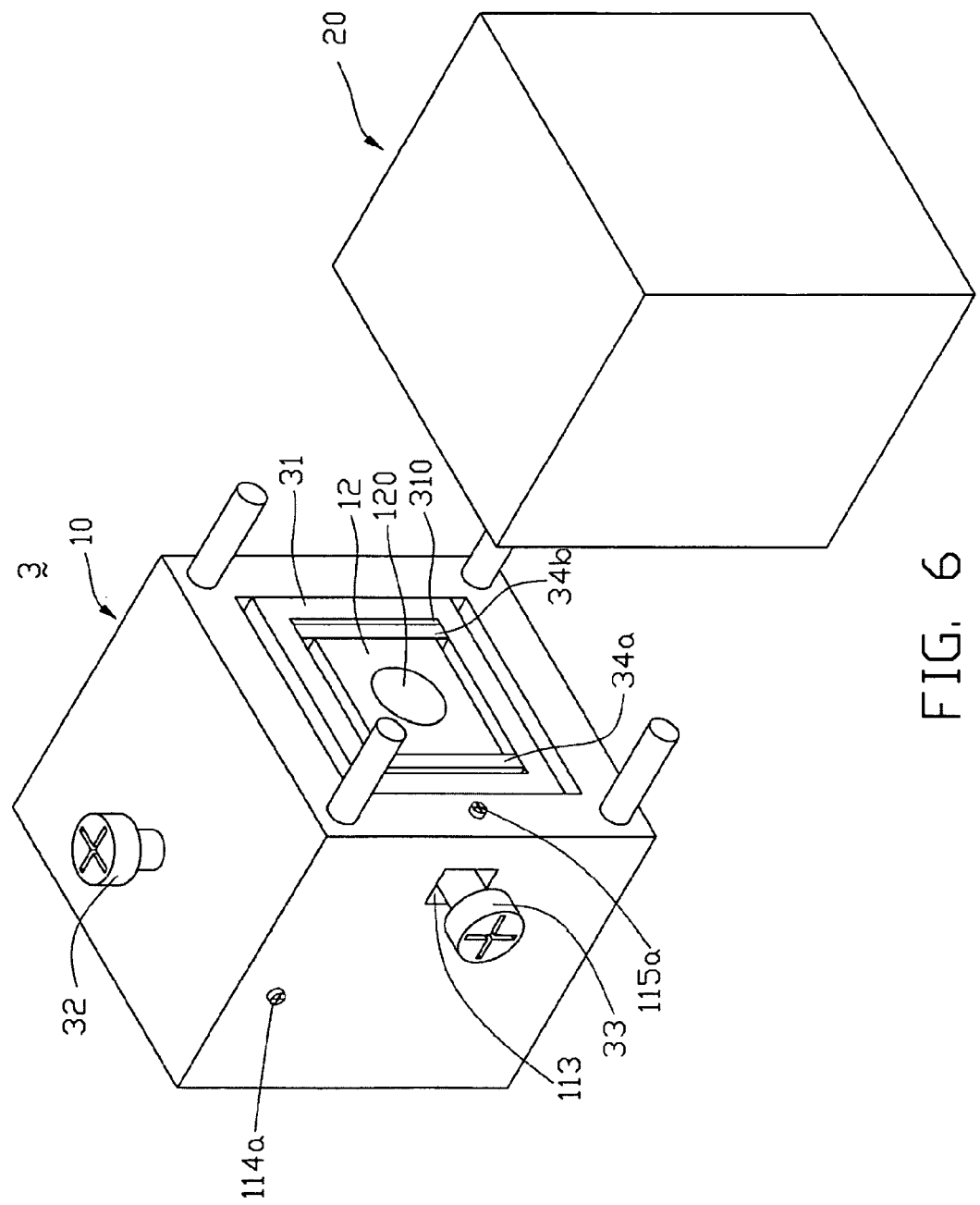
FIG. 6 is a schematic view of a molding assembly according to a third preferred embodiment.

FIG. 6 shows an exemplary molding assembly 3 according to a third preferred embodiment. The molding assembly 3 is essentially similar to the molding assembly 1 illustrated in the first preferred embodiment. However, two guide blocks 34a, 34b are fixed to the core member 12, and are configured for supporting the core member 12, thus abrasion of the core member 12 can be reduced. Preferably, two guide slots (not shown) configured for movement of the two guide blocks 34a, 34b can be defined parallel to the lengthwise direction of the second elongated adjusting member 32 in the inner wall of the containing block 31, thus the movement of the guide blocks 34a, 34b together with the core member 12 can be performed more precisely.

Figure 7:
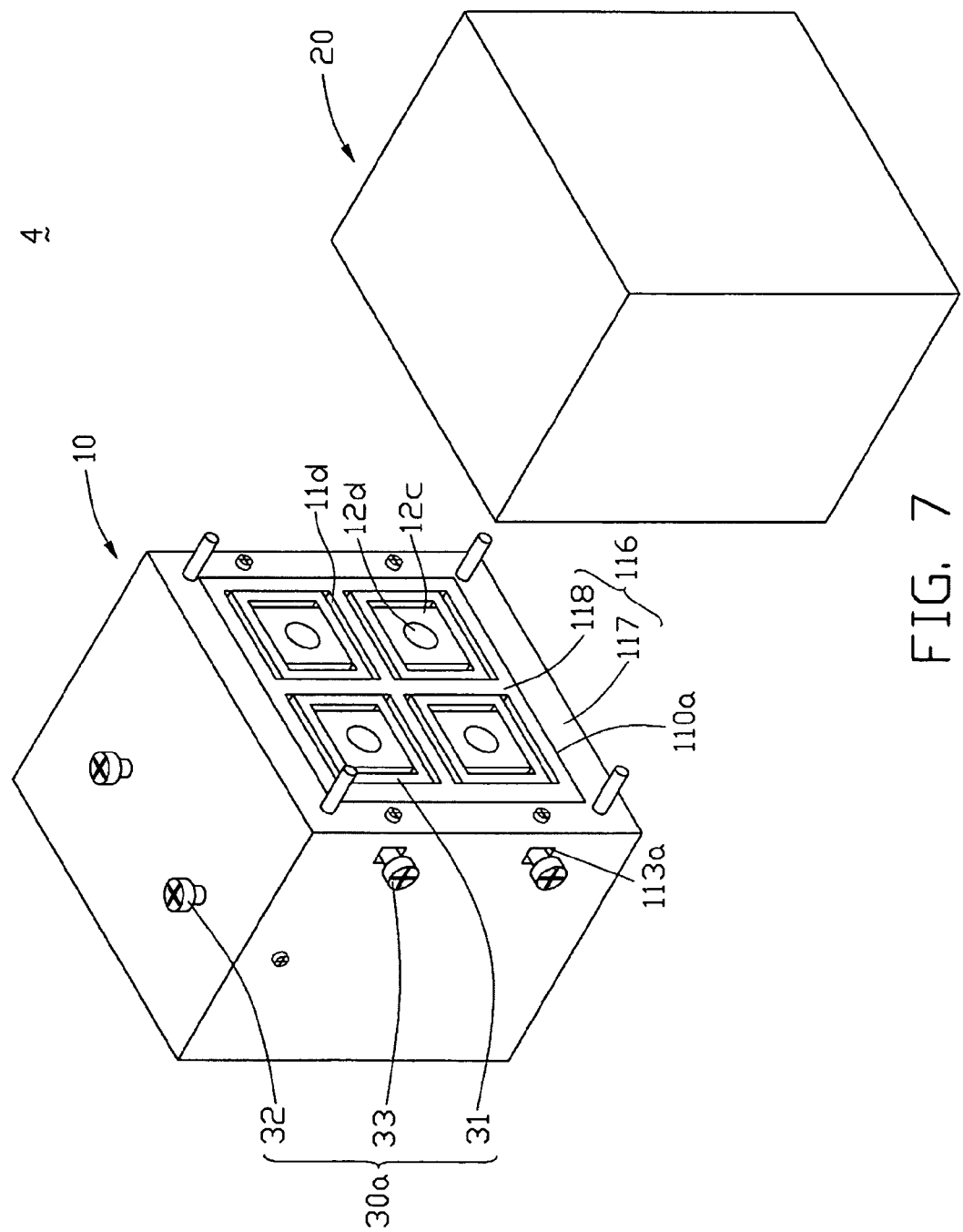
FIG. 7 is a schematic view of a molding assembly according to a fourth preferred embodiment.

FIG. 7 shows an exemplary molding assembly 4 according to a fourth preferred embodiment. The molding assembly 4 is essentially similar to the molding assembly 1 illustrated in the first preferred embodiment. However, a mold housing 116 is comprised of a mold plate 117 having a housing space 110a defined therein and a cavity member 118 received in the housing space 110a. The cavity member 118 includes four cavities 11d. Four core members 12c are received in the four cavities 11d, respectively. Each of the core members 12c has a molding surface 12d, and can be a member such as an insert. Accordingly, the second mold part 20 is configured for matching the first mold part 10, i. e., the second mold part 20 also has four core members (not shown) therein. Four adjustment assemblies 30a are included in the mold housing 116. Each of the adjustment assemblies 30a includes a containing block 31, a first elongated adjusting member 32 and a second elongated adjusting member 33. Two of the first elongated adjusting members 32 are rotatably held by a top wall of the mold housing 116 and an intermediate horizontal wall of the cavity member 118, and are in threaded engagement with the respective containing blocks 31. The other two first elongated adjusting members 32 (not visible) are rotatably held by a bottom wall of the mold housing 116 and the intermediate horizontal wall of the cavity member 118, and are in threaded engagement with the respective containing blocks 31. Two of the second elongated adjusting members 33 pass through openings 113a defined in a side Wall of the mold housing 116, and are rotatably held by the respective containing blocks 31 and in threaded engagement with the respective core members 12c. The other two second elongated adjusting members 33 (not visible) pass through openings (not visible) defined in another side wall of the mold housing 116, and are rotatably held by the respective containing blocks 31 and in threaded engagement with the respective core members 12c. The adjustment assemblies 30a are configured for adjusting the molding surfaces 12d of the core members 12c to match the molding surfaces of the core members (not shown) of the second mold part 20.

The molding assembly 4 can mold 4 workpieces at once.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A molding assembly, comprising:
   a first mold housing defining a first engaging hole therein;
   a second mold housing configured for movable attachment to the first mold housing;
   a hollow containing block received in the first mold housing, the containing block having a containing space defined therein and a second engaging hole in communication with the containing space;
   a first core member received in the containing space of the containing block, the first core member having a molding surface thereon;
   a second core member received in the second mold housing for matching with the first core member;
   a first elongated adjusting member having a first portion held but rotatable in the first engaging hole of the first mold housing and a second portion in threaded engagement with the containing block, wherein when the first elongated adjusting member is rotated, the containing block together with the first core member is capable of moving along a lengthwise direction of the first elongated adjusting member; and
   a second elongated adjusting member having a first portion held but rotatable in the second engaging hole of the containing block and a second portion in threaded engagement with the first core member, a lengthwise direction of the second elongated adjusting member being oriented perpendicular to the lengthwise direction of the first elongated adjusting member, wherein when the second elongated adjusting member is rotated, the first core member is capable of moving in the containing space along the lengthwise direction of the second elongated adjusting member.

2. The molding assembly as claimed in claim 1, wherein each of the first mold housing and the second mold housing comprises a mold plate having a housing space, and the containing block and the second core member are respectively received in the housing spaces.

3. The molding assembly as claimed in claim 1, wherein each of the first mold housing and the second mold housing comprises a mold plate and a cavity member received in the mold plate, each of the cavity members comprises a cavity, and the containing block and the second core member are respectively received in the cavities.

4. The molding assembly as claimed in claim 1, wherein a plurality of leader pins are defined protruding from the first mold housing, a plurality of leader bushings are defined in the second mold housing and are configured for matching with the leader pins, and thus the first mold housing and the second mold housing can be oriented in directions opposite to each other.

5. The molding assembly as claimed in claim 1, wherein the first mold housing defines an opening configured for allowing the second elongated adjusting member to move, in unison with the containing block, in the lengthwise direction of the first elongated adjusting member.

6. The molding assembly as claimed in claim 1, wherein the first mold housing defines an opening configured for allowing a tool to access and rotate the second elongated adjusting member.

7. The molding assembly as claimed in claim 1, wherein the containing block defines a first threaded hole configured for alignment with the first engaging hole, the first core member defines a second threaded hole configured for alignment with the second engaging hole, and the first and second elongated adjusting members are threadedly engaged in the first and second threaded holes respectively.

8. The molding assembly as claimed in claim 1, wherein each of the first elongated adjusting member and the second elongated adjusting member is an adjusting screw, and each of the second portions thereof is threaded.

9. The molding assembly as claimed in claim 1, further comprising a first latching member and a second latching member, each of the first elongated adjusting member and the second elongated adjusting member having a recess shaped in the first portion, the first and second latching members being configured for respectively latchingly engaging in the recesses of the first and second elongated adjusting members.

10. The molding assembly as claimed in claim 9, wherein each of the first and second latching members is threadedly engaged with the first mold housing.

11. The molding assembly as claimed in claim 1, wherein a width of the containing space along the lengthwise direction of the second elongated adjusting member is larger than a corresponding width of the first core member, and a height of the containing space along the lengthwise direction of the first elongated adjusting member is slightly larger than a height of the first core member.

12. The molding assembly as claimed in claim 1, wherein the first mold housing further defines a housing space receiving the containing block therein, a width of the housing space along the lengthwise direction of the second elongated adjusting member is slightly larger than a corresponding width of the containing block, and a height of the housing space along the lengthwise direction of the first elongated adjusting member is larger than a height of the containing block.

13. The molding assembly as claimed in claim 1, wherein the first core member comprises two guide blocks fixed to opposite sides thereof, the guide blocks capable of supporting the first core member when the first core member is moved in the containing space.

14. The molding assembly as claimed in claim 5, wherein a height of the opening along the lengthwise direction of the first elongated adjusting member is larger than a diameter of the first portion of the second elongated adjusting member.

15. The molding assembly as claimed in claim 6, wherein the second elongated adjusting member comprises a head at an outmost end thereof adjacent the first portion thereof, the head is located in the opening, and a height of the opening along the lengthwise direction of the first elongated adjusting member is larger than a diameter of the head.

16. A molding assembly, comprising:
a first mold housing having a housing space defined therein and two first engaging holes defined in walls thereof, the first engaging holes being in communication with the housing space;
a second mold housing configured for movable attachment to the first mold housing;
a hollow containing block received in the housing space of the first mold housing, the containing block having a containing space defined therein and two second engaging holes defined in walls thereof, the second engaging holes being in communication with the containing space;
a first core member received in the containing space of the containing block, the first core member having a molding surface thereon;
a second core member received in the second mold housing, the second core member matching the first core member;
a first elongated adjusting member held but rotatable in the first engaging holes of the first mold housing and in threaded engagement with the containing block in a manner such that the containing block together with the first core member is capable of moving in the housing space along a lengthwise direction of the first elongated adjusting member when the first elongated adjusting member is rotated; and
a second elongated adjusting member disposed perpendicular to the first elongated adjusting member, the second elongated adjusting member held but rotatable in the second engaging holes of the containing block and in threaded engagement with the first core member in a manner such that the first core member is capable of moving in the containing space along a lengthwise direction of the second elongated adjusting member when the second elongated adjusting member is rotated.

17. A molding assembly, comprising:
a first mold housing having a housing space defined therein and a cavity member received in the housing space, the cavity member having a plurality of cavities defined therein;
a second mold housing configured for movable attachment to the first mold housing;
a plurality of hollow containing blocks received in the plurality of cavities, respectively, each of the containing blocks having a containing space defined therein;
a plurality of first core members received in the plurality of containing spaces, respectively, each of the first core members having a molding surface thereon;
a plurality of second core members received in the second mold housing for matching the first core members, respectively;
a plurality of first elongated adjusting members held but rotatable in the first mold housing and the cavity member, and in threaded engagement with the plurality of containing blocks, respectively, in a manner such that the containing blocks together with the first core members are capable of moving in the cavities along lengthwise directions of the respective first elongated adjusting members when the first elongated adjusting members are rotated; and
a plurality of second elongated adjusting members disposed perpendicular to the plurality of first elongated adjusting members, the second elongated adjusting members held but rotatable in the plurality of containing blocks, respectively, and in threaded engagement with the plurality of first core members respectively, in a manner such that the first core members are capable of moving in the respective containing spaces along lengthwise directions of the respective second elongated adjusting members when the second elongated adjusting members are rotated.

* * * * *